United States Patent [19]

Jones

[11] 4,060,406
[45] Nov. 29, 1977

[54] ARC STEELMAKING

[75] Inventor: Evan Thomas Richard Jones, Birmingham, England

[73] Assignee: Foseco International Limited, Birmingham, England

[21] Appl. No.: 703,674

[22] Filed: July 8, 1976

[30] Foreign Application Priority Data

July 16, 1975   United Kingdom ............... 29920/75

[51] Int. Cl.$^2$ ........................... C21C 5/52; C22B 9/10
[52] U.S. Cl. ........................................... 75/12; 75/53; 75/257
[58] Field of Search .................. 75/10, 11, 12, 94, 68, 75/53

[56] References Cited

U.S. PATENT DOCUMENTS

| | | | |
|---|---|---|---|
| 2,416,179 | 2/1947 | Kemmer | 75/53 |
| 2,848,321 | 8/1958 | Bunbury | 75/68 R |
| 3,723,094 | 3/1973 | Schlatter | 75/10 R |

*Primary Examiner*—Peter D. Rosenberg
*Attorney, Agent, or Firm*—Cushman, Darby & Cushman

[57] ABSTRACT

The invention provides a slag conditioner for use in electric arc steelmaking which comprises 30 to 80% by weight of alumina, 10 to 30% by weight of aluminium 5 to 40% by weight fluorspar and 0 to 20% by weight of alkali metal carbonate. The conditioner is added with lime to deoxidized steel suitably in an amount of from 5 to 15 Kg/tonne of steel to promote rapid reduction of the initial refining slag iron oxide content together with increased slag fluidity and a faster rate of lime dissolution to form a reactive slag.

12 Claims, No Drawings

ARC STEELMAKING

This invention relates to a slag conditioner for use in electric arc steelmaking.

For the production of quality steels and particularly when a very low sulphur content is required, refining in the electric arc basic steelmaking process is usually carried out under a reducing slag. In this process, the initial oxidising slag is removed, the metal is deoxidised, usually with aluminum, ferro-silicon and/or ferro-maganese, and a reducing slag is formed by the addition of lime, fluospar and carbon to the bath.

According to the present invention there is provided a slag conditioner for use in electric arc steelmaking, which conditioner comprises, by weight:

alumina—30 to 80%
aluminum—10 to 30%
fluorspar—5 to 40%.

The conditioner may additionally include up to 20% by weight of an alkali metal carbonate e.g. sodium carbonate.

The raw materials present in the conditioner should be low in sulphur, phosphorus and iron oxide, but otherwise may be selected from a variety of commercially available grades of materials. Thus, pit solids may be used as the preferred source of alumina and ball mill dust may be used as the preferred source of aluminium. The ball mill dust should preferably have an elemental aluminium content of from 20 to 35% by weight, most preferably about 30% by weight.

The slag conditioner of the invention may be mixed with lime in a suitable proportion e.g. in a weight ratio of 1 part conditioner to 2 to 8 parts of lime in order to provide a slag forming agent.

The main factors promoting desulphurisation of steel by a slag are well documented in the literature and can be summarised as (1) a high slag basicity, (2) low temperature, (3) reducing conditions, and (4) high carbon and silicon contents in the steel. In addition, the rate of desulphurisation is increased by (1)high slag fluidity and (2) turbulence.

In the conditioner of the invention the alumina reacts with the lime to form a fluid slag at conventional steelmaking temperatures. In addition, the aluminium in the conditioner reduces the iron oxide content of the slag and this is followed by a reduction of the silica content to silicon, forming further alumina which again fluidises the slag. As a result of the low silica content of the slag, the basicity expressed as the V-ratio, $CaO:SiO_2$ is correspondingly increased. This increase in basicity combined which the low iron oxide level in the slag results in more effective desulphurisation than that obtained with conventional practice.

A further advantage of the slag produced using the conditioner of the invention is that the amount of oxide inclusions in the final steel is reduced since aluminous inclusions float out of the bath faster than siliceous inclusions.

The conditioner may also include up to 15% by weight of one or more alkaline earth metal oxides e.g. magnesium oxide and/or calcium oxide. These oxides may be present as impurities in the other ingredients of the conditioner e.g. alumina or fluorspar, or, since they have some beneficial effect on the fluidity and/or basicity of the final slag, they may be added separately when not present as impurities.

In addition the conditioner may include up to 5% by weight of silica as an impurity in the other ingredients of the conditioner. However, since silica is acidic under the conditions of use, the amount of silica should desirably be kept as low as possible by the use of high purity raw materials where these are available.

The invention includes a method of making steel using an electric arc steelmaking furnace which includes the steps of deoxidising the steel, and forming a slag by the addition to the steel of lime and a slag conditioner in accordance with the invention. Where the lime and conditioner are added separately to the steel, the addition of each ingredient may be in any order but desirably should be consecutive. Preferably, however, the lime and conditioner are added together as a slag forming agent as defined above.

The conditioner of the invention is preferably employed in an amount of from 5 to 15% kg/tonne of steel.

The following examples serve to illustrate the invention:

EXAMPLE 1

A slag conditioner composition was made up (by weight) of:

alumina—55%
aluminium—20%
fluorspar—10%
magnesium oxide—5%
calcium oxide—5%
silica—5%

A 0.10% carbon, 0.4–0.6% maganese, 0.1–0.2% silicon, 0.025% minimum aluminium grade steel was refined in a 1 tonne electric arc furnace. After deoxidation of the steel with aluminium and ferro-silicon, a reducing slag was formed by mixing 1 part of the above conditioner with 3 parts of lime. 15 minutes later the composition of the slag was:

CaO—58.2%
$SiO_2$—9.4%
$Al_2O_3$—22.9%
MgO—5.6%
FeO—0.9%
MnO—0.5%
V-ratio basicity was 6.2

In comparison on a similar grade of steel refined with a conventional reducing slag comprising a major proportion of lime, a smaller proportion of fluorspar and a small amount of carbon.

The slag composition after 15 minutes was:
CaO—45.9%
$SiO_2$—11.5%
$Al_2O_3$—11.2%
MgO—3.6%
FeO—3.7%
MnO—2.1%
V-ratio basicity was 4.0

The increased desulphurisation potential of the slag formed using the slag conditioner of the present invention over that obtained during conventional refining is shown by the sulphur levels in the steel after approximately 15 minutes treatment.

initial sulphur in steel—0.030%
conventional practice—0.030% no change
slag conditioner added—0.026% 4 points of sulphur removed

EXAMPLE 2

The procedure described in Example 1 was repeated with the exception that the treatment was maintained for 50 minutes after which the slags were analysed.

|  | CaO | SiO₂ | Al₂O₃ | MgO | FeO | MnO |
| --- | --- | --- | --- | --- | --- | --- |
| slag conditioner used | 57.8 | 9.4 | 24.8 | 4.6 | 0.2 | 0.2 |
| conventional practice | 52.1 | 18.8 | 12.1 | 7.6 | 0.6 | 0.3 |
| V-ratio basicity | (slag conditioner used) | | | | | 6.1 |
| V-ratio basicity | (conventional practice) | | | | | 2.8 |

In this case the sulphur content was:

| conventional practice | 0.014% | 16 points of sulphur removed |
| --- | --- | --- |
| slag conditioner used | 0.008% | 22 points of sulphur removed |

EXAMPLE 3

A slag conditioner of the following composition was made up (by weight):
alumina—60%
aluminium—18%
fluorspar—10%
sodium carbonate—5%
silica,—1%
calcium oxide—3%
magnesium oxide—3%

A 0.10% carbon steel was treated subsequent to deoxidation with a reducing slag of 2 parts lime to 1 part slag conditioner. After refining for 50 minutes, a comparison was made between the invention and a conventional practice.

| Slag Analyses | CaO | SiO₂ | Al₂O₃ | MgO | FeO | MnO | Basicity |
| --- | --- | --- | --- | --- | --- | --- | --- |
| conventional practice | 52.1 | 18.8 | 12.1 | 7.6 | 0.6 | 0.3 | 2.8 |
| slag conditioner used | 56.5 | 10.4 | 27.8 | 7.6 | 0.5 | 0.3 | 5.4 |

Steel Sulphur Contents

Conventional practice—0.014%
slag conditioner used—0.011%

EXAMPLE 4

A slag conditioner composition was made up (by weight
alumina—37%
aluminium—18%
fluorspar—30%
sodium carbonate—15%

A 0.30/0.35% carbon steel was treated with a reducing slag of 2 parts lime to 1 part slag conditioner subsequently to a conventional melting and oxidising step, followed by a deoxidising step. During the reducing or second stage 10 Kg of lime per tonne of steel was added to the furnace together with 5 Kg of slag conditioner per tonne of steel. The second refining period continued for 40 minutes.

Slag Analyses (After 35 minutes)

|  | CaO | SiO₂ | Al₂O₃ | MgO | FeO | MnO | V Ratio Basicity |
| --- | --- | --- | --- | --- | --- | --- | --- |
| conventional practice | 54.2 | 16.6 | 10.4 | 12.8 | 0.5 | 0.3 | 3.3 |
| slag conditioner used | 58.2 | 8.2 | 22.4 | 8.1 | 0.1 | 0.2 | 7.1 |

Samples of molten metal were taken throughout the refining process and analysed for quantity of sulphur present the results of which were as follows:

|  | sulphur as melted | sulphur at slag-off | sulphur at pre-tap | sulphur at pit |
| --- | --- | --- | --- | --- |
| conventional practice | 0.049% | 0.042% | 0.028% | 0.020% |
| slag conditioner used | 0.052% | 0.048% | 0.024% | 0.011% |

These results indicate that during the second refining stage 77% of the total sulphur present at slag-off was removed by the time the metal reached the casting pit. Using conventional practice the maximum amount of sulphur removed would not normally exceed 60%.

EXAMPLE 5

A slag conditioner composition was made up (by weight) of:
alumina—70%
aluminium—20%
fluorspar—10%

The procedure described in Example 4, was repeated using the above conditioner with the exception that the second refining period was maintained for 61 minutes and the quantity of conditioner used was 10 Kg/tonne. The analysis of the slag produced after 61 minutes was compared with that from conventional practice and is set out below:

|  | CaO | SiO₂ | Al₂O₃ | MgO | FeO | MnO | V-Ratio Basicity |
| --- | --- | --- | --- | --- | --- | --- | --- |
| Conventional practice | 45.2 | 19.7 | 14.0 | 9.4 | 3.3 | 1.7 | 2.3 |
| Slag Conditioner used | 57.8 | 9.4 | 24.8 | 4.6 | 0.3 | 0.2 | 6.1 |

In this Example the sulphur content at slag-off was adjusted to 0.030% for both conventional practice and when the conditioner was used. At the end of the second refining period the sulphur was analysed as:

|  | sulphur at slag-off | sulphur at pit | % sulphur reduction |
| --- | --- | --- | --- |
| conventional practice | 0.030 | 0.015 | 50% |
| slag conditioner used | 0.030 | 0.008 | 73% |

As can be seen from the above Examples, the slag conditioner of the present invention promotes rapid reduction of the initial refining slag iron oxide content together with increased slag fluidity and a faster rate of lime dissolution to form a reactive slag. The conditioner improves the refining properties of the slag thus formed by promoting a highly basic lime/alumina system. Furthermore, the time for carrying out the process is reduced so that the plant is rendered more efficient. These properties are particularly important in the case where extremely low sulphur in the final steel is required. Use of the conditioner enables consistently low sulphur values to be obtained, typically 0.010% or below, whereas conventional practice provides around 0.015%. Metallurgically the improvement is very significant since an ultra high quality steel is produced.

I claim:

1. A slag conditioner for use in electric arc steelmaking, which conditioner comprises by weight:
    alumina—30 to 80%
    aluminium—10 to 30%
    fluorspar—5 to 40%
and up to 20% by weight of alkali metal carbonate.

2. A slag conditioner according to claim 1, which includes up to 20% by weight of sodium carbonate.

3. A slag conditioner according to claim 1, wherein the alumina is provided by pit solids.

4. A slag conditioner according to claim 1, wherein the aluminium is provided by ball mill dust.

5. A slag conditioner according to claim 1, wherein the aluminium is provided by ball mill dust having an elemental aluminium content of 20 to 35% by weight.

6. A slag conditioner for use in electric arc steelmaking, which conditioner comprises, by weight:
    alumina—30 to 80%
    aluminium—10 to 30%
    fluorspar—5 to 40%
and up to 15% by weight of at least one oxide selected from alkaline earth metal oxide.

7. A slag conditioner according to claim 6, which includes up to 15% by weight of at least one oxide selected from magnesium oxide, calcium oxide and mixtures thereof.

8. A slag forming agent comprising a slag conditioner for use in electric arc steelmaking, which conditioner comprises, by weight:
    alumina—30 to 80%
    aluminium—10 to 30%
    fluorspar—5 to 40%
admixed with lime.

9. A method of making steel in an electric arc steelmaking furnace comprising the steps of deoxidising the steel and forming a slag by adding to the steel lime and a slag conditioner which comprises by weight:
    alumina—30 to 80%
    aluminium—10 to 30%
    fluorspar—5 to 40%.

10. A method according to claim 9 wherein the lime and conditioner are added to the steel admixed together.

11. A method according to claim 9 wherein the conditioner is employed in an amount of from 5 to 15 Kg/tonne of steel.

12. A method according to claim 9 wherein the metal is deoxidised with a deoxidising agent selected from the group consisting of aluminium, ferrosilicon, ferromaganese and mixtures thereof.

* * * * *